H. C. BULL.
Apparatus for Supplying and Filtering Water.
No. 209,858. Patented Nov. 12, 1878.
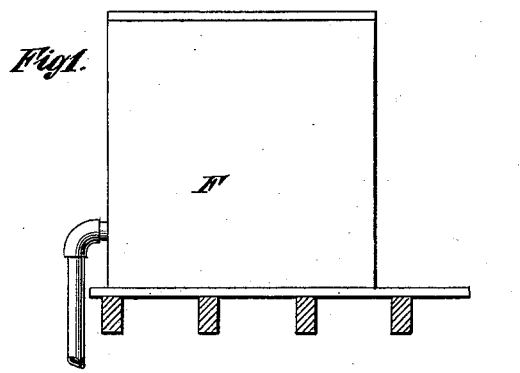
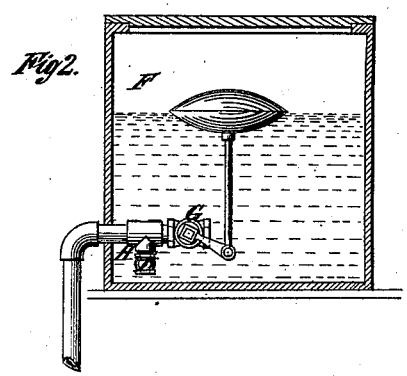
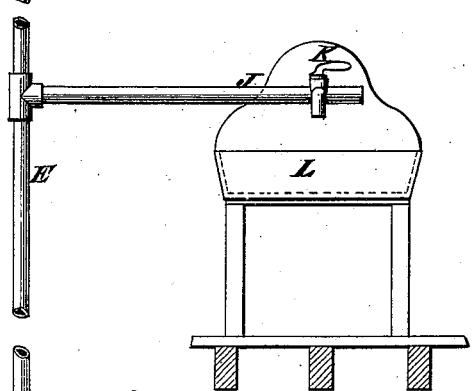
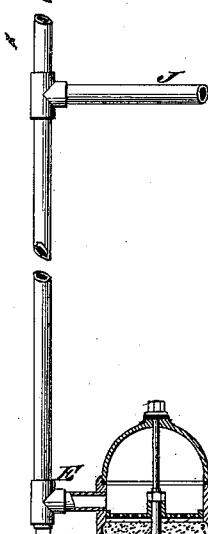
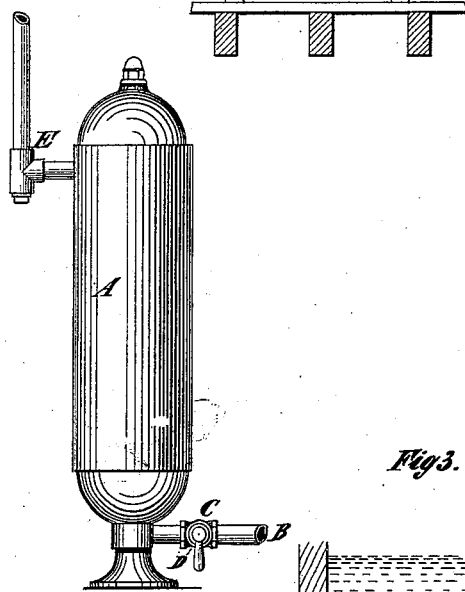
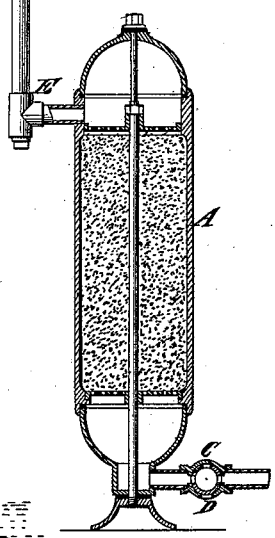
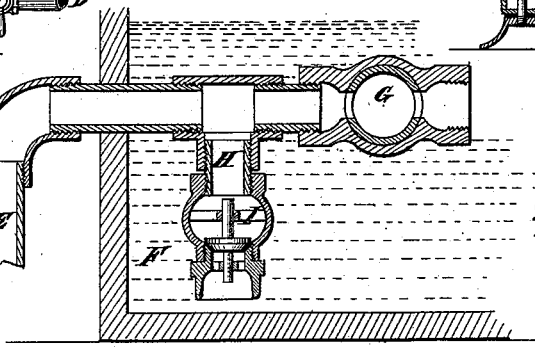

UNITED STATES PATENT OFFICE.

HENRY C. BULL, OF BROOKLYN, NEW YORK.

IMPROVEMENT IN APPARATUS FOR SUPPLYING AND FILTERING WATER.

Specification forming part of Letters Patent No. 209,858, dated November 12, 1878; application filed September 19, 1878.

*To all whom it may concern:*

Be it known that I, HENRY C. BULL, of Brooklyn, in Kings county, and State of New York, have invented certain new and useful Improvements in Apparatus for Supplying and Filtering Water, of which the following is a specification:

This invention consists in a combination, with a filter provided with suitable inlet and outlet pipes, a tank into which said outlet-pipe leads, a valve or cock operated through a float in the tank, and an inwardly-opening check-valve, of a waste or escape passage communicating with said inlet-pipe, and a cock or valve for establishing communication between the inlet-pipe and filter, or between the filter and the waste or escape passage, whereby, on the adjustment of the last-named cock or valve to establish communication between the filter and the waste or escape passage, the filtered water in the tank may be caused to flow backward through the filter in sufficient quantity to thoroughly cleanse the filter.

In the accompanying drawings, Figure 1 is a side view of a filtering apparatus embodying my invention. Fig. 2 is a sectional side view of the same; and Fig. 3 is an enlarged view of a portion of the tank of such apparatus, as also a portion of the outlet-pipe of the filter and its appurtenances.

Similar letters of reference designate corresponding parts in all the figures.

A designates a filter, which may be of any suitable form, but is preferably made like that for which I have previously applied for Letters Patent—namely, of a cylindrical body, two hemispherical ends, two internally-arranged perforated diaphragms, with filtering material, such as charcoal, interposed, and a bolt securing all parts longitudinally together. Its inlet-pipe B is shown as provided with a three-way cock or valve, C, capable of operation by means of a suitable handle, so as to establish communication between the inlet-pipe and the lower part of the filter, and a waste or escape passage, D, to cause or permit water to flow therefrom. Its outlet-pipe E communicates with a tank, F, wherein water passing through the filter is collected. The portion of this pipe which is within the tank F is furnished with a valve or cock, G, having attached to its key a lever and float, for the purpose of closing it to preclude the entrance of water into the tank after the water has accumulated therein to a certain extent. This portion of the outlet-pipe is also furnished with a branch pipe, H, extending, preferably, nearly to the bottom of the tank, and furnished with an inwardly-opening check-valve, I, whereby provision is afforded for the flow of water backward from the tank through the outlet-pipe.

J designates a pipe for conducting water to water-dispensing apparatus in the house or other building in which the filter is used—in the present instance to a faucet, K, used in connection with a sink, L.

Filtered water flowing from the tank through the check-valve I back into the outlet-pipe E may pass through the filter, to thoroughly wash out the same, the cock or valve C being turned to establish communication between the filter and the waste or escape passage D, to admit of the outflow of the water; or filtered water may flow from the tank into the pipe J, the outlet-pipe E then acting as a service-pipe as well as a supply-pipe for the tank F.

It will be seen that by my invention I provide for accumulating a large quantity of filtered water, and for causing it to flow back through and thoroughly wash out and cleanse the filter in all cases, and that I provide for utilizing a single pipe (the outlet-pipe of the filter) both as a supply-pipe for the tank receiving the filtered water and as a service-pipe for the building where the filter is used, because water will flow through it to the dispensing apparatus either directly from the filter or from the tank wherein filtered water is accumulated.

What I claim as my invention, and desire to secure by Letters Patent, is—

The combination, with a filter provided with suitable inlet and outlet pipes, a tank into which said outlet-pipe leads, a valve or cock operated through a float in the tank, and an inwardly-opening check-valve, of a waste or escape passage and a cock or valve for establishing communication between the inlet-pipe and filter, or between said filter and the waste or escape passage, substantially as and for the purpose specified.

HENRY C. BULL.

Witnesses:
 J. E. CANNON,
 W. W. SILVER.